(12) United States Patent
Konishi

(10) Patent No.: US 12,033,510 B2
(45) Date of Patent: Jul. 9, 2024

(54) DIVISION LINE RECOGNITION APPARATUS

(71) Applicant: Honda Motor Co., Lt.d, Tokyo (JP)

(72) Inventor: Yuichi Konishi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 325 days.

(21) Appl. No.: 17/592,464

(22) Filed: Feb. 3, 2022

(65) Prior Publication Data
US 2022/0262252 A1 Aug. 18, 2022

(30) Foreign Application Priority Data
Feb. 12, 2021 (JP) ................................. 2021-020418

(51) Int. Cl.
G05D 1/00 (2024.01)
G06T 7/73 (2017.01)
G06V 10/25 (2022.01)
G06V 20/56 (2022.01)
G08G 1/16 (2006.01)

(52) U.S. Cl.
CPC .......... *G08G 1/167* (2013.01); *G05D 1/0244* (2013.01); *G06T 7/73* (2017.01); *G06V 10/25* (2022.01); *G06V 20/588* (2022.01); *G06T 2207/30256* (2013.01)

(58) Field of Classification Search
CPC .... G06T 7/30; G06T 7/33; G06T 7/70; G06T 7/73; G06T 2207/30256; G06V 10/25; G06V 20/588; G05D 1/0231; G05D 1/0246; G05D 1/244; G05D 1/246; G05D 1/2462; G08G 1/167
See application file for complete search history.

(56) References Cited

U.S. PATENT DOCUMENTS

| | | | |
|---|---|---|---|
| 2015/0302574 A1* | 10/2015 | Muramatsu et al. | ............ B62D 15/0275 348/148 |
| 2018/0273031 A1* | 9/2018 | Fujita et al. | ........... G01C 21/30 |
| 2020/0307380 A1* | 10/2020 | Ikeda et al. | ........... B60W 30/16 |

FOREIGN PATENT DOCUMENTS

| CN | 112288805 A | * | 1/2021 | ............. G01S 11/12 |
|---|---|---|---|---|
| JP | 2014104853 A | | 6/2014 | |

\* cited by examiner

*Primary Examiner* — Andrew W Johns
(74) *Attorney, Agent, or Firm* — Duft & Bornsen, PC

(57) ABSTRACT

A division line recognition apparatus including a detection part configured to detect an external situation around a subject vehicle, and an electronic control unit including a microprocessor and a memory connected to the microprocessor. The microprocessor is configured to perform generating a map including a division line information on a division line on a road based on the external situation detected by the detection part, setting an area of an external space detectable by the detection part, determining whether an end of the division line on the map is located at a boundary of the area of the external space, and adding a boundary information to the division line information when it is determined that the end of the division line is located at the boundary.

18 Claims, 7 Drawing Sheets

DIVISION LINE RECOGNITION APPARATUS

CROSS-REFERENCE TO RELATED APPLICATION

This application is based upon and claims the benefit of priority from Japanese Patent Application No. 2021-020418 filed on Feb. 12, 2021, the content of which is incorporated herein by reference.

BACKGROUND OF THE INVENTION

Field of the Invention

This invention relates to a division line recognition apparatus configured to recognize a division line on a road.

Description of the Related Art

As this type of apparatus, conventionally, there is a known apparatus in which white lines of a lane and a parking lot frame are recognized using an image captured by a camera mounted on a vehicle, and the recognition results of the white lines are used for vehicle driving control and parking support. Such an apparatus is described, for example, in Japanese Unexamined Patent Publication No. 2014-104853 (JP2014-104853A). In the apparatus disclosed in JP2014-104853A, edge points at which a change in luminance in the captured image is equal to or greater than a threshold is extracted, and the white lines are recognized based on the edge points.

However, when the white lines are recognized simply based on the edge points as in the apparatus described in JP2014-104853A, there is a possibility that the state of the white line is erroneously recognized if the recognized white line is cut off, which makes it difficult to appropriately perform driving control or the like using the white line (a division line).

SUMMARY OF THE INVENTION

An aspect of the present invention is a division line recognition apparatus, including a detection part configured to detect an external situation around a subject vehicle, and an electronic control unit including a microprocessor and a memory connected to the microprocessor. The microprocessor is configured to perform: generating a map including a division line information on a division line on a road, based on the external situation detected by the detection part; setting an area of an external space detectable by the detection part; determining whether an end of the division line on the map is located at a boundary of the area of the external space; and adding a boundary information to the division line information when it is determined that the end of the division line is located at the boundary.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1A to 7. A division line recognition apparatus according to an embodiment of the invention is applied to a vehicle having a self-driving capability, i.e., a self-driving vehicle, for example. The self-driving vehicle having the division line recognition apparatus may be sometimes called "subject vehicle" to differentiate it from other vehicles. The subject vehicle is an engine vehicle having an internal combustion engine (engine) as a travel drive source, electric vehicle having a travel motor as the travel drive source, or hybrid vehicle having both of the engine and the travel motor as the travel drive source. The subject vehicle can travel not only in a self-drive mode in which a driving operation by a driver is unnecessary, but also in a manual drive mode in which the driving operation by the driver is necessary.

Figure 1:
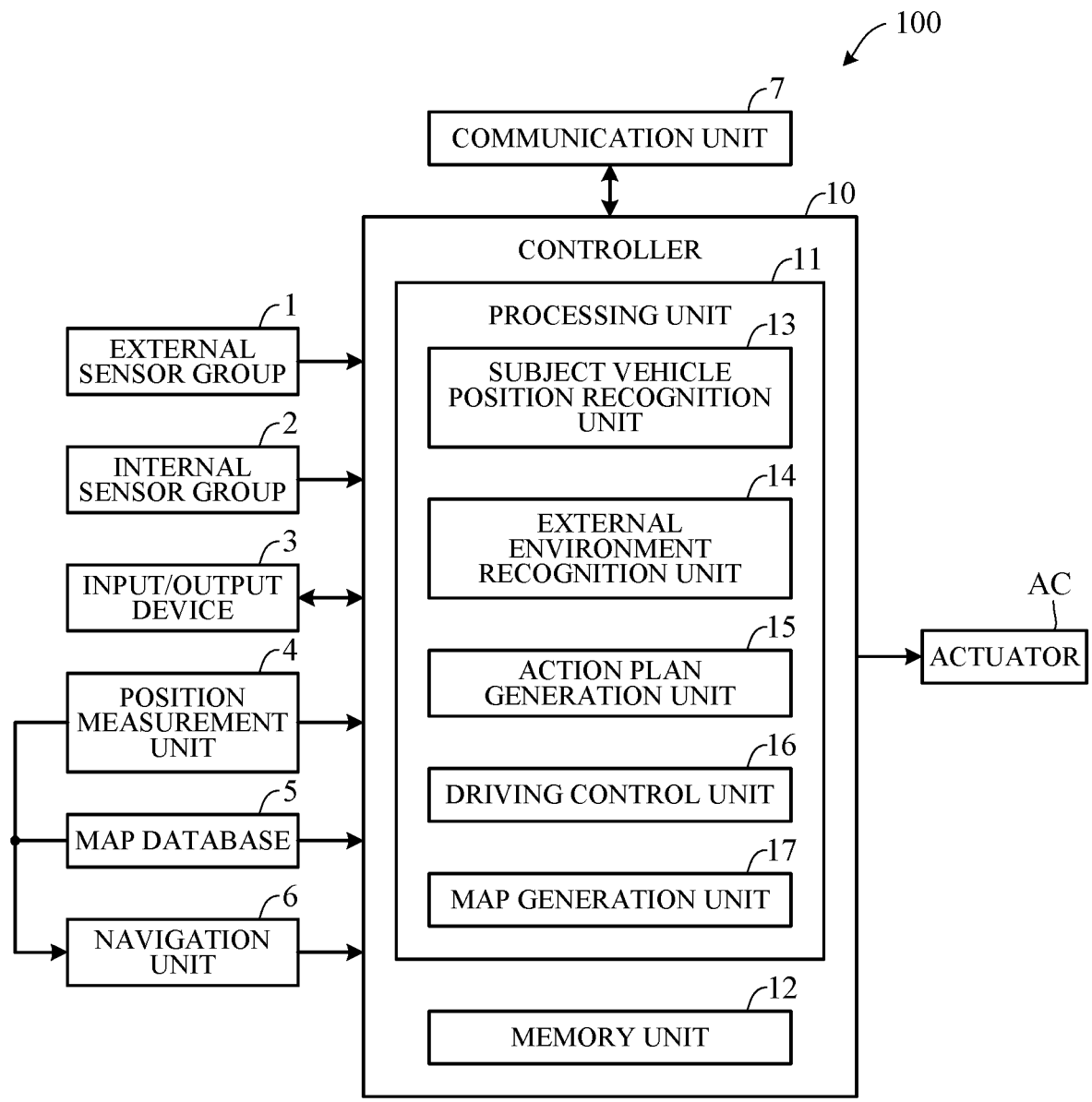
FIG. 1 is a block diagram schematically illustrating an overall configuration of a vehicle control system having a division line recognition apparatus according to an embodiment of the present invention.

First, the general configuration of the subject vehicle for self-driving will be explained. FIG. 1 is a block diagram schematically illustrating an overall configuration of a vehicle control system 100 of the subject vehicle having the division line recognition apparatus according to an embodiment of the present invention. As shown in FIG. 1, the vehicle control system 100 mainly includes a controller 10, and an external sensor group 1, an internal sensor group 2, an input/output device 3, a position measurement unit 4, a map database 5, a navigation unit 6, a communication unit 7 and actuators AC which are communicably connected with the controller 10.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) for measuring distance from the subject vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source, a yaw rate sensor for detecting rotation angle speed around a vertical axis passing center of gravity of the subject vehicle and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The positioning satellites are satellites such as GPS satellites and Quasi-Zenith satellite. The position measurement unit 4 measures absolute position (latitude, longitude and the like) of the subject vehicle based on signal received by the position measurement sensor.

The map database 5 is a unit storing general map data used by the navigation unit 6 and is, for example, implemented using a hard disk or semiconductor element. The map data include road position data and road shape (curvature etc.) data, along with intersection and road branch position data. The map data stored in the map database 5 are different from high-accuracy map data stored in a memory unit 12 of the controller 10.

The navigation unit 6 retrieves target road routes to destinations input by the driver and performs guidance along selected target routes. Destination input and target route guidance is performed through the input/output device 3. Target routes are computed based on current position of the subject vehicle measured by the position measurement unit 4 and map data stored in the map database 35. The current position of the subject vehicle can be measured, using the values detected by the external sensor group 1, and on the basis of this current position and high-accuracy map data stored in the memory unit 12, target route may be calculated.

The communication unit 7 communicates through networks including the Internet and other wireless communication networks to access servers (not shown in the drawings) to acquire map data, travel history information, traffic data and the like, periodically or at arbitrary times. In addition to acquiring travel history information, travel history information of the subject vehicle may be transmitted to the server via the communication unit 7. The networks include not only public wireless communications network, but also closed communications networks, such as wireless LAN, Wi-Fi and Bluetooth, which are established for a predetermined administrative area. Acquired map data are output to the map database 5 and/or memory unit 12 via the controller 10 to update their stored map data.

The actuators AC are actuators for traveling of the subject vehicle. If the travel drive source is the engine, the actuators AC include a throttle actuator for adjusting opening angle of the throttle valve of the engine (throttle opening angle). If the travel drive source is the travel motor, the actuators AC include the travel motor. The actuators AC also include a brake actuator for operating a braking device and turning actuator for turning the front wheels FW.

The controller 10 is constituted by an electronic control unit (ECU). More specifically, the controller 10 incorporates a computer including a CPU or other processing unit (a microprocessor) 51 for executing a processing in relation to travel control, the memory unit (a memory) 12 of RAM, ROM and the like, and an input/output interface or other peripheral circuits not shown in the drawings. In FIG. 1, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information) for self-driving. The road map information includes information on road position, information on road shape (curvature, etc.), information on gradient of the road, information on position of intersections and branches, information on type and position of division line such as white line, information on the number of lanes, information on width of lane and the position of each lane (center position of lane and boundary line of lane), information on position of landmarks (traffic lights, signs, buildings, etc.) as a mark on the map, and information on the road surface profile such as unevennesses of the road surface, etc. The map information stored in the memory unit 12 includes map information (referred to as external map information) acquired from the outside of the subject vehicle through the communication unit 7, and map information (referred to as internal map information) created by the subject vehicle itself using the detection values of the external sensor group 1 or the detection values of the external sensor group 1 and the internal sensor group 2.

The external map information is, for example, information of a map (called a cloud map) acquired through a cloud server, and the internal map information is information of a map (called an environmental map) consisting of point cloud data generated by mapping using a technique such as SLAM (Simultaneous Localization and Mapping). The external map information is shared by the subject vehicle and other vehicles, whereas the internal map information is unique map information of the subject vehicle (e.g., map information that the subject vehicle has alone). In an area in which no external map information exists, such as a newly established road, an environmental map is created by the subject vehicle itself. The memory unit 12 also stores information such as programs for various controls, and thresholds used in the programs.

As functional configurations in relation to mainly self-driving, the processing unit 11 includes a subject vehicle position recognition unit 13, an external environment recognition unit 14, an action plan generation unit 15, a driving control unit 16, and a map generation unit 17.

The subject vehicle position recognition unit 13 recognizes the position of the subject vehicle (subject vehicle position) on the map based on position information of the subject vehicle calculated by the position measurement unit 4 and map information stored in the map database 5.

Optionally, the subject vehicle position can be recognized using map information stored in the memory unit 12 and ambience data of the subject vehicle detected by the external sensor group 1, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 7.

The external environment recognition unit 14 recognizes external circumstances around the subject vehicle based on signals from cameras, LIDERs, RADARs and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road division lines (white lines, etc.) and stop lines, buildings, guardrails, power poles, commercial signs, pedestrians, bicycles, and the like. Recognized states of other objects include, for example, traffic light color (red, green or yellow) and moving speed and direction of pedestrians and bicycles. A part of a stationary object among other objects, constitutes a landmark serving as an index of position on the map, and the external environment recognition unit 14 also recognizes the position and type of the landmark.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along target path generated by the action plan generation unit 15. More specifically, the driving control unit 16 calculates required driving force for achieving the target accelerations of sequential unit times calculated by the action plan generation unit 15, taking running resistance caused by road gradient and the like into account. And the driving control unit 16 feedback-controls the actuators AC to bring actual acceleration detected by the internal sensor group 2, for example, into coincidence with target acceleration. In other words, the driving control unit 16 controls the actuators AC so that the subject vehicle travels at target speed and target acceleration. On the other hand, in manual drive mode, the driving control unit 16 controls the actuators AC in accordance with driving instructions by the driver (steering operation and the like) acquired from the internal sensor group 2.

The map generation unit 17 generates the environment map constituted by three-dimensional point cloud data using detection values detected by the external sensor group 1 during traveling in the manual drive mode. Specifically, an edge indicating an outline of an object is extracted from a camera image acquired by the camera based on luminance and color information for each pixel, and a feature point is extracted using the edge information. The feature point is, for example, an intersection of the edges, and corresponds to a corner of a building, a corner of a road sign, or the like. The map generation unit 17 calculates the distance to the extracted feature point and sequentially plots the feature point on the environment map, thereby generating the environment map around the road on which the subject vehicle has traveled. The environment map may be generated by extracting the feature point of an object around the subject vehicle using data acquired by radar or LIDAR instead of the camera.

The subject vehicle position recognition unit 13 performs subject vehicle position estimation processing in parallel with map creation processing by the map generation unit 17. That is, the position of the subject vehicle is estimated based on a change in the position of the feature point over time. The map creation processing and the position estimation processing are simultaneously performed, for example, according to an algorithm of SLAM. The map generation unit 17 can generate the environment map not only when the vehicle travels in the manual drive mode but also when the vehicle travels in the self-drive mode. If the environment map has already been generated and stored in the memory unit 12, the map generation unit 17 may update the environment map with a newly obtained feature point.

Figure 2A:
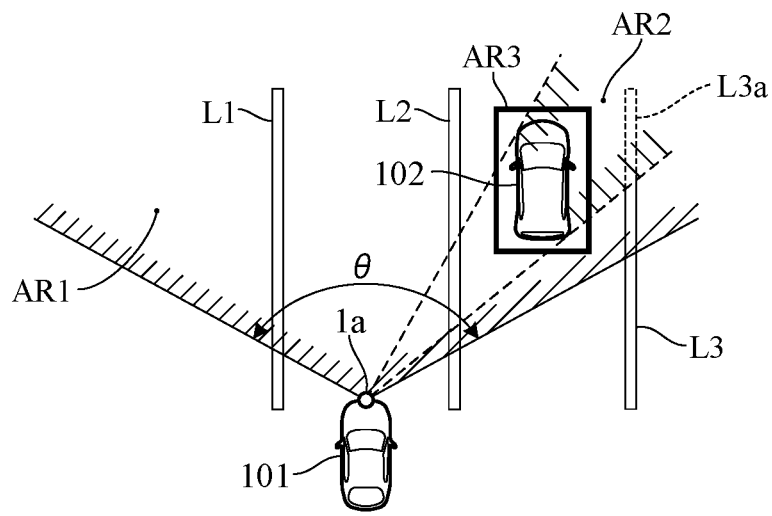
FIG. 2A is a view illustrating an example of a traveling scene to which the division line recognition apparatus according to the embodiment of the invention is applied.

A configuration of the division line recognition apparatus according to the present embodiment will be described. FIG. 2A is a view illustrating an example of a traveling scene to which the division line recognition apparatus 50 is applied, and illustrates a scene in which the subject vehicle 101 travels in the manual drive mode while creating the environment map. As illustrated in FIG. 2A, a camera 1a is mounted on a front portion of the subject vehicle 101. The camera 1a has a viewing angle (angle of view $\theta$) unique to the camera, and images an area AR1 within a predetermined viewing angle indicated by hatching. The area AR1 includes, for example, a plurality of division lines (for example, white lines) L1 to L3 and another vehicle 102. No obstacle is present between the camera 1a and the division lines L1 and L2.

On the other hand, an obstacle (the other vehicle 102) is present between the camera 1a and the division line L3. Therefore, an area behind the other vehicle 102 as viewed from the camera 1a, that is, an area AR2 indicated by hatching is a blind spot area of the camera 1a, and a division line L3 (dotted line) within the area AR2 is hidden by the other vehicle 102 and cannot be imaged by the camera 1a. In this case, there is a possibility that it is recognized that there is no division line L3 although there is the division line L3 in the area L3a of the dotted line, that is, it is recognized that a part of the division line L3 is cut off. In order to prevent the division line L3 from being erroneously recognized as being cut off under such a condition, the division line recognition apparatus is configured as follows in the present embodiment. Hereinafter, the dotted line area L3a where it is unknown whether or not there is a division line is referred to as a division line unknown area.

Figure 3:
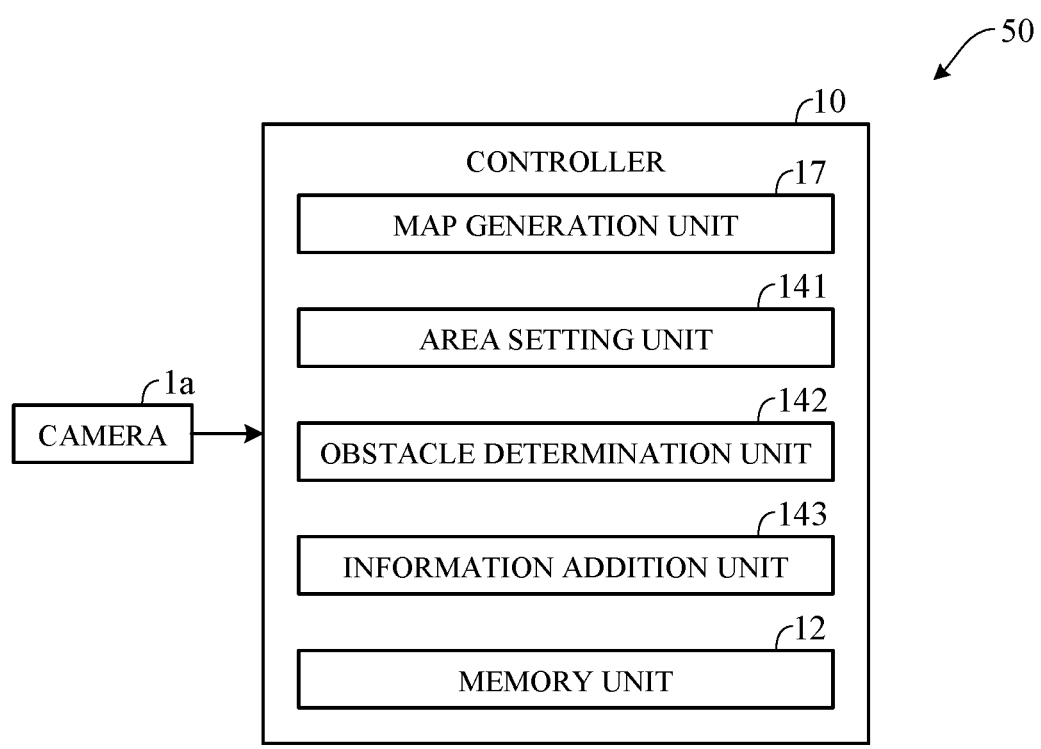
FIG. 3 is a block diagram illustrating a configuration of a substantial part of the division line recognition apparatus according to the embodiment of the invention.

In the following description, in order to avoid a complicated description, it is assumed that the division lines L1 to L3 are also recognized at the same time as the subject vehicle 101 generates the environment map by traveling in the manual drive mode. FIG. 3 is a block diagram illustrating a configuration of a substantial part of the division line recognition apparatus 50 according to the present embodiment. The division line recognition apparatus 50 constitutes a part of the vehicle control system 100 in FIG. 1. As illustrated in FIG. 3, the division line recognition apparatus 50 includes the controller 10 and the camera 1a.

The camera 1a is a monocular camera having an imaging element (image sensor) such as a CCD or a CMOS, and constitutes a part of the external sensor group 1 in FIG. 1. The camera 1a may be a stereo camera. The camera 1a is mounted at a predetermined position, for example, in front of the subject vehicle 101 (FIG. 2A), and continuously captures an image of a space in front of the subject vehicle 101 to acquire an image (camera image) of an object. The object is a division line (for example, the division lines L1 to L3 in FIG. 2A) and an obstacle (for example, the other vehicle 102 in FIG. 2A) on the road, and the camera 1a detects the object around the subject vehicle 101. The object may be detected by LIDAR or the like instead of the camera 1a or together with the camera 1a.

The controller 10 in FIG. 3 includes an area setting unit 141, an obstacle determination unit 142, and an information addition unit 143 in addition to the map generation unit 17 as a functional configuration undertaken by the processing unit 11 (FIG. 1). The area setting unit 141, the obstacle determination unit 142, and the information addition unit 143 have a function to recognize the external environment and constitute a part of the external environment recognition unit 14 in FIG. 1. Since the area setting unit 141, the obstacle determination unit 142, and the information addition unit 143 also have a map generation function, all or a part of them may be included in the map generation unit 17.

The map generation unit 17 generates the environment map by extracting the feature point of the object around the subject vehicle 101 based on the camera image acquired by the camera 1a during traveling in the manual drive mode. The generated environment map is stored in the memory unit 12. The map generation unit 17 recognizes the position of the division line on the road surface based on the camera image, and includes the information on the division line in the map information (for example, the internal map information) and stores the map information. The recognized division line is a division line within the area AR1 (FIG. 2A) defined by the angle of view θ of the camera 1a. The stored division line information includes information about the color (white or yellow) and the type (solid line or broken line) of the division line.

The area setting unit 141 detects the object around the subject vehicle 101 and detects the position of the object using the information on the feature point from the camera image. The object is a moving body on the road such as the other vehicle 102 in FIG. 2A, a bicycle, or a pedestrian, and the area setting unit 141 also identifies the type of the object. The object is also referred to as an obstacle. Furthermore, the area setting unit 141 sets an area (obstacle area) including the entire detected object. For example, as illustrated in FIG. 2A, a rectangular obstacle area AR3 including the entire other vehicle 102 is set. The obstacle area AR3 may not be rectangular. In FIG. 2A, the obstacle area AR3 is exaggeratedly illustrated as an area larger than the other vehicle 102, but the obstacle area AR3 may be the same area as an area that outlines the other vehicle 102.

The obstacle determination unit 142 determines whether or not the longitudinal end of the division line recognized by the map generation unit 17 and the obstacle area AR3 set by the area setting unit 141 are adjacent to each other on the two-dimensional camera image. This is a determination as to whether or not there is a possibility that the division line is hidden by the obstacle. That is, when the end of the division line is adjacent to the obstacle area AR3, there is a possibility that a part of the division line (a division line unknown area L3a in FIG. 2A) is recognized as the end of the division line because it is hidden by the obstacle on the front side of the division line. Therefore, the obstacle determination unit 142 determines that there is a possibility that the detection of the division line is obstructed by the obstacle when the obstacle area AR3 is adjacent to the end of the division line.

The obstacle determination unit 142 may determine that there is a possibility that the detection of the division line is obstructed by the obstacle by another method. For example, the determination may be made by identifying an area that is a blind spot of the camera 1a due to the obstacle (the area AR2 in FIG. 2A) based on the camera image, and determining whether or not the end of the division line in contact with a boundary line that defines the area AR2 is present.

When the obstacle determination unit 142 determines that the obstacle adjacent to the end of the division line is present on the camera image, the information addition unit 143 adds the obstacle detection information to the division line information and store the division line information in the memory unit 12. That is, the attribute of the obstacle detection is added to the area L3a where the division line L3 is cut off, as illustrated in FIG. 2A, that is, an extension area of the division line L3 (the division line unknown area L3a). At this time, the map generation unit 17 generates a tentative map by adding a division line to the division line unknown area L3a to which the obstacle detection information has been added, on the assumption that the division line L3 extends without being cut off. The tentative map is referred to, for example, when the action plan generation unit 15 generates the action plan. The addition of the division line may be performed in consideration of the position information of the ends of the other division lines L1 and L2 extending in parallel with the division line to be added.

Figure 2B:
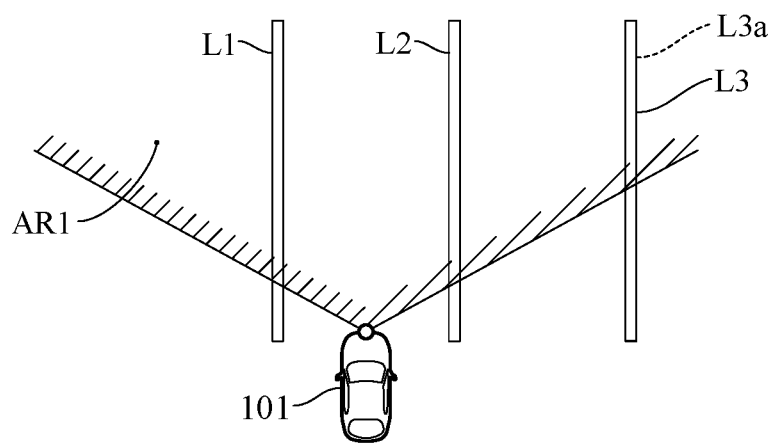
FIG. 2B is a view illustrating another example of a traveling scene to which the division line recognition apparatus according to the embodiment of the invention is applied.

After the obstacle detection information is added, there are cases where the camera 1a detects a division line in the division line unknown area L3a, for example, because the obstacle (the other vehicle 102) has retracted as illustrated in FIG. 2B, or no obstacle is detected when the vehicle travels at the same point again. In this case, the information addition unit 143 removes the obstacle detection information from the division line information in the memory unit 12 to which the obstacle detection information has been added. At this time, the map generation unit 17 updates the environment map using the division line information from which the obstacle detection information has been removed, and finalizes the map information (the internal map information). That is, the position of the division line is not finalized in a state in which the obstacle detection information is added, and the position of the division line is finalized after the obstacle detection information is removed. The finalized map information is stored in the memory unit 12 and used for driving control of a self-driving vehicle.

On the other hand, the information addition unit 143 also removes the obstacle detection information when the camera 1a does not detect the division line in the division line unknown area L3a even though there is no obstacle. In this case, the map generation unit 17 updates the environment map by deleting the information on the tentative division line that has been added within the division line unknown area L3*a*. This finalizes that there is no division line in the division line unknown area L3*a*. The presence or absence of the obstacle after the obstacle detection information is added is determined by the obstacle determination unit 142 based on the camera image.

Figure 4:
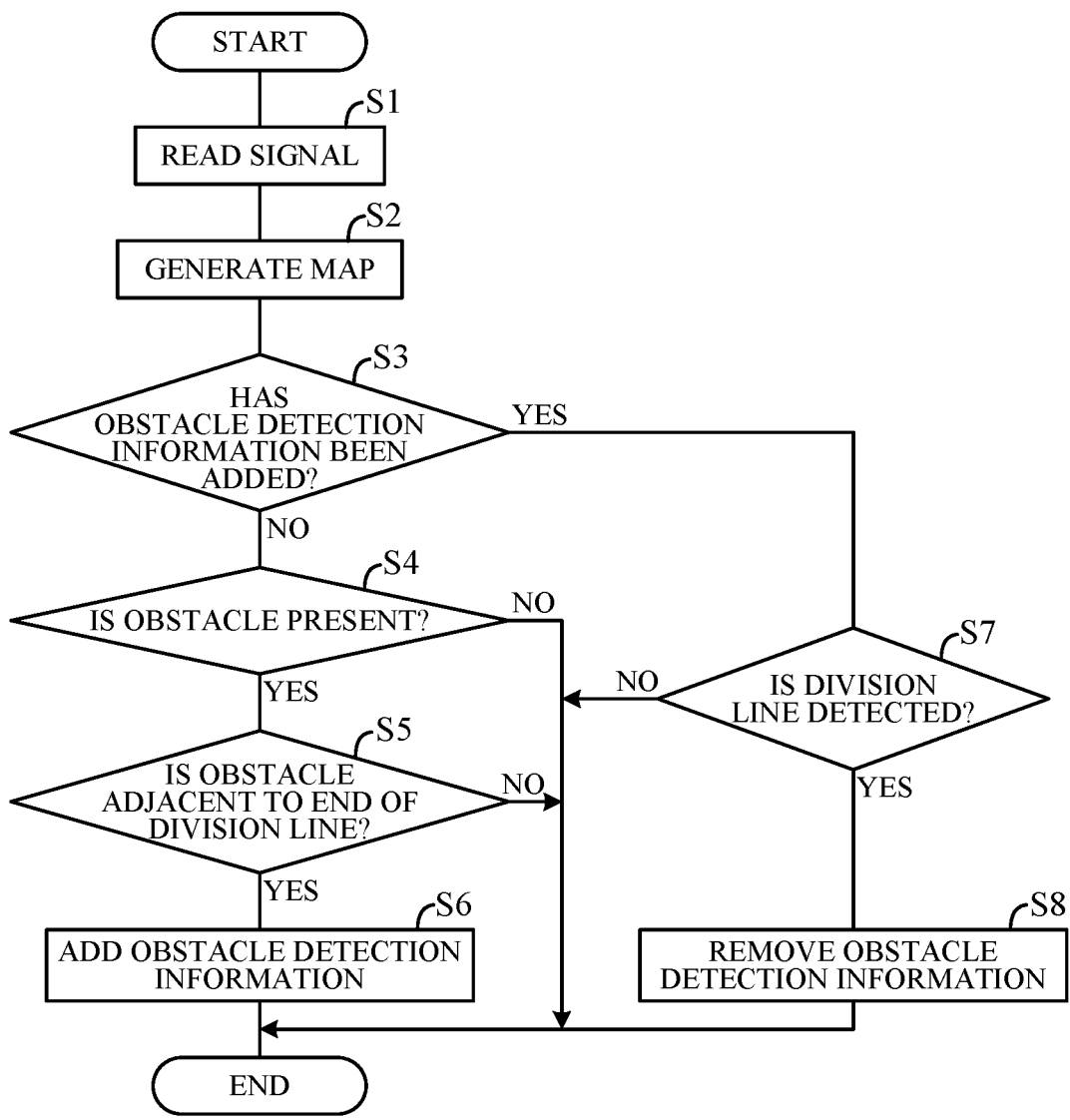
FIG. 4 is a flowchart illustrating an example of processing executed by a controller in FIG. 3.

FIG. 4 is a flowchart illustrating an example of processing executed by the controller 10 in FIG. 3 according to a predetermined program, particularly an example of processing regarding division line recognition. The processing illustrated in this flowchart is started, for example, during traveling in the manual drive mode, and is repeated at a predetermined cycle while traveling in the manual drive mode continues.

As illustrated in FIG. 4, first in S1 (S: processing step), an image signal obtained by the camera 1*a* is read. Next, in S2, a map around the subject vehicle 101, that is, the environment map is generated based on the camera image acquired in S1, and the environment map is stored in the memory unit 12. At this time, the position of the division line on the road surface is recognized based on the camera image, and the information on the division line is included in the map information of the environment map and the map information is stored. Next, in S3, it is determined whether or not the area to which the obstacle detection information has been added is included in the camera image obtained in S1, that is, whether or not the obstacle detection information has already been added to the division line information (for example, in the previous processing). When a negative determination is made in S3, the processing proceeds to S4.

In S4, it is determined whether or not an obstacle is present within the viewing angle of the camera based on the camera image acquired in S1. When a positive determination is made in S4, the processing proceeds to S5; when a negative determination is made, the processing ends. In S5, the obstacle area AR3 including the entire detected obstacle is set, and it is determined whether or not the obstacle area AR3 and the longitudinal end of the division line recognized in S2 are adjacent to each other on the two-dimensional camera image. When a positive determination is made in S5, the processing proceeds to S6; when a negative determination is made, the processing ends.

In S6, the obstacle detection information is added to the division line information and the division line information is stored in the memory unit 12. Furthermore, the tentative map is generated by adding a division line to the division line unknown area L3*a* to which the obstacle detection information has been added, on the assumption that the division line extends without being cut off, the tentative map is stored in the memory unit 12, and the processing ends.

Meanwhile, when a positive determination is made in S3, the processing proceeds to S7, and it is determined whether or not a division line is detected within the division line unknown area L3*a* to which the obstacle detection information has been added, based on the camera image acquired in S1. When a positive determination is made in S7, the processing proceeds to S8; when a negative determination is made, the processing ends. In S8, the obstacle detection information is removed from the division line information stored in the memory unit 12. Further, the environment map generated in S2 is updated using the detected division line. The updated environment map is used when the action plan generation unit 15 generates the action plan.

Although not illustrated, when a negative determination is made in S7, a determination may be made on whether or not an obstacle is present, and when it is determined that no obstacle is present, the obstacle detection information may be removed and the environment map may be updated by determining that the division line is cut off. That is, when the division line is not detected within the division line unknown area L3*a* although no obstacle is present, the processing may end by finalizing that the division line is cut off.

The operation of the division line recognition apparatus 50 according to the present embodiment will be described more specifically. When the subject vehicle 101 travels in the manual drive mode, the environment map is generated based on the camera image. Then, when the division lines L1 to L3 are detected as illustrated in FIG. 2A, the position information of the division lines L1 to L3 (the division line information) is stored in association with the environment map (S2). At this time, when the other vehicle 102 is present in front of the division line L3, a part of the division line L3 (the division line unknown area L3*a*) may not be detected by the camera 1*a*. In this case, since the image of the other vehicle 102 is adjacent to the image of the end of the division line L3 (the boundary with the division line unknown area L3*a*), the obstacle detection information is added to the division line information (S6). Therefore, the controller 10 can grasp the position where the state of the division line is unknown as to whether or not there is a division line, and can perform appropriate driving control such as prohibiting traveling in the self-drive mode in the division line unknown area L3*a*.

Thereafter, when the other vehicle 102 retreats from the surroundings of the subject vehicle 101 and the division line L3 in the division line unknown area L3*a* is detected as illustrated in FIG. 2B, the obstacle detection information is removed from the division line information (S8). This finalizes the division line information, and thereafter, the traveling operation of the subject vehicle 101 is controlled in the self-drive mode using the map including the finalized division line information. As described above, in the present embodiment, it is merely required to detect the state of the division line in the division line unknown area L3*a* to which the obstacle detection information has been added and update the information on the division line based on the detection result, and thus the processing of updating the environment map is easy.

The present embodiment can achieve advantages and effects such as the following:

(1) The division line recognition apparatus 50 includes the camera 1*a* that detects an external situation around the subject vehicle 101, a map generation unit 17 that generates the environment map including the division line information on the division line on the road based on the external situation detected by the camera 1*a*, the obstacle determination unit 142 that determines whether or not the obstacle (the other vehicle 102) is adjacent to the end of the division line L3 on the map generated by the map generation unit 17 based on the external situation detected by the camera 1*a*, and the information addition unit 143 that adds the obstacle detection information to the division line information when the obstacle determination unit 142 determines that the obstacle is adjacent to the end of the division line (FIG. 3).

With this configuration, when a determination cannot be clearly made on whether or not the division line is cut off due to the presence of the obstacle, the obstacle detection information is added to the division line information without determining that the division line is cut off. Therefore, it is possible to prevent erroneous recognition that the actual division line is cut off when the division line is cut off due to the presence of the obstacle, and thus to appropriately perform driving control or the like using the division line.

(2) The division line recognition apparatus 50 further includes the area setting unit 141 that sets the obstacle area AR3 occupied by the obstacle on the map generated by the map generation unit 17 based on the external situation detected by the camera 1a (FIG. 3). The obstacle determination unit 142 determines whether or not the end of the division line is adjacent to the obstacle area AR3 set by the area setting unit 141 (FIG. 4). This makes it possible to easily determine whether or not the obstacle is adjacent to the end of the division line, and thus facilitates the processing.

(3) The map generation unit 17 generates the tentative map including a division line added in the area where the division line is cut off (the division line unknown area L3a) and to which the obstacle detection information has been added by the information addition unit 143. This makes it possible to perform driving control of the subject vehicle 101 using the tentative map even when it is not clear whether or not the obstacle and the end of the division line are adjacent to each other and the division line is cut off.

(4) The division line recognition apparatus 50 further includes the memory unit 12 that stores the division line information to which the obstacle detection information has been added (FIG. 3). After adding the obstacle detection information to the division line information, the information addition unit 143 removes the obstacle detection information from the division line information stored in the memory unit 12 when the division line in the area where the division line is cut off is detected by the camera 1a. This can finalize the division line information and thus makes it possible to appropriately perform traveling of the subject vehicle 101 in the self-drive mode using the environment map including the finalized division line information.

Figure 5A:
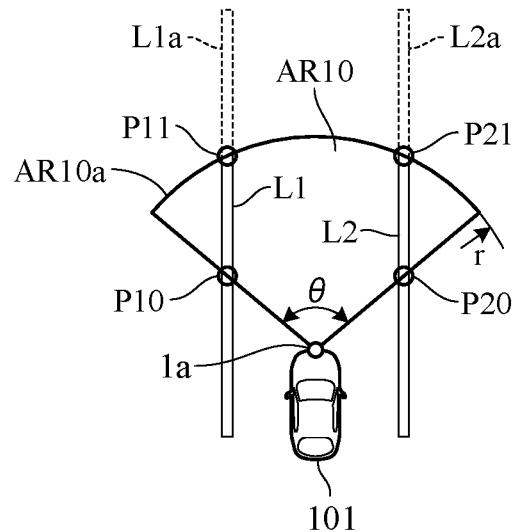
FIG. 5A is a view illustrating further example of a traveling scene to which the division line recognition apparatus according to the embodiment of the invention is applied.

Incidentally, the division line unknown area is generated not only when the obstacle is present in front of the division line as described above, but also when the division line is located in an area exceeding the limit of the detection performance of the detection part such as the camera 1a. FIG. 5A is a view illustrating this point, and shows an example of a scene in which the subject vehicle 101 travels in the manual drive mode while creating the environment map.

As illustrated in FIG. 5A, the camera 1a has a unique viewing angle θ and maximum detection distance r determined by the performance of the camera itself. The inside of a fan-shaped area AR10 having a radius r and a central angle θ centered on the camera 1a is an area of an external space detectable by the camera 1a (a detectable area AR10). The detectable area AR10 corresponds to the area AR1 in FIG. 2A. Intersections P10, P11, P20, and P21 between the boundary line indicating the detectable area AR10 and the division lines L1 and L2 are limit points determined by the detection performance of the camera itself, and the camera 1a can detect an area from the limit point P10 to the limit point P11 of the division line L1 and an area from the limit point P20 to the limit point P21 of the division line L2.

Therefore, areas L1a and L2a indicated by dotted lines outside the detectable area AR10 in the traveling direction of the subject vehicle 101 are a division line unknown area where the presence of a division line is unknown. In order to prevent the division lines L1 and L2 from being erroneously recognized as being cut off under such a condition, the division line recognition apparatus is further configured as follows in the present embodiment.

Figure 6:
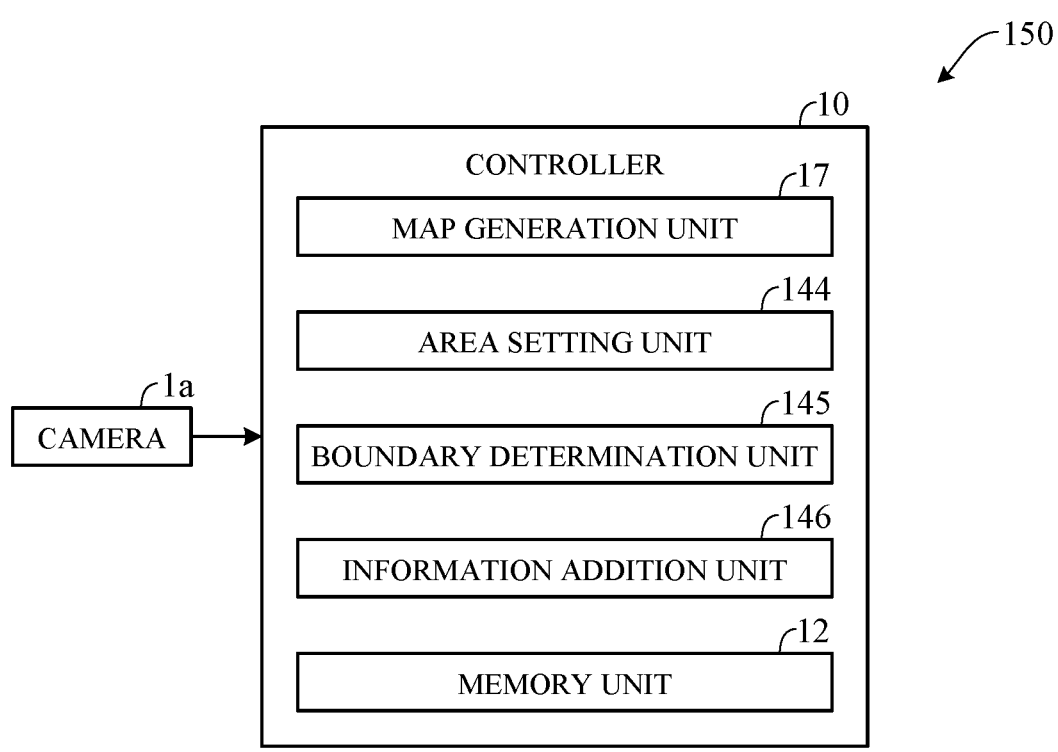
FIG. 6 is a block diagram illustrating a configuration of a substantial part of the division line recognition apparatus according to another embodiment of the invention.

In the following description, in order to avoid a complicated description, it is assumed that the division lines L1 and L2 are also recognized at the same time as the subject vehicle 101 generates the environment map by traveling in the manual drive mode. FIG. 6 is a block diagram illustrating a configuration of a substantial part of the division line recognition apparatus 150 according to the present embodiment, and is a diagram illustrating an aspect different from that in FIG. 3. The division line recognition apparatus 150 constitutes a part of the vehicle control system 100 in FIG. 1 and includes the controller 10 and the camera 1a. Note that the same components as those in FIG. 3 are denoted by the same reference numerals, and differences from FIG. 3 will be mainly described below.

The memory unit 12 of the controller 10 in FIG. 6 stores in advance the viewing angle θ and the maximum detection distance r that represent the performance of the camera 1a. The controller 10 includes an area setting unit 144, a boundary determination unit 145, and an information addition unit 146 in addition to the map generation unit 17 as a functional configuration undertaken by the processing unit 11 (FIG. 1). The area setting unit 144, the boundary determination unit 145, and the information addition unit 146 have a function to recognize the external environment and constitute a part of the external environment recognition unit 14 in FIG. 1. Since the area setting unit 144, the boundary determination unit 145, and the information addition unit 146 also have a map generation function, all or a part of them may be included in the map generation unit 17.

Figure 5B:
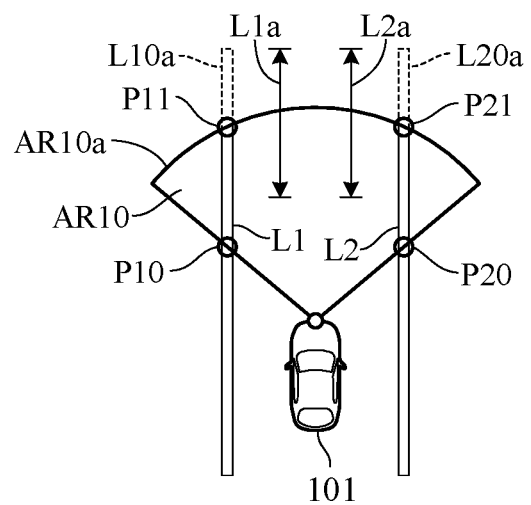
FIG. 5B is a view illustrating an example of a traveling scene following the traveling scene in FIG. 5A.
Figure 5C:
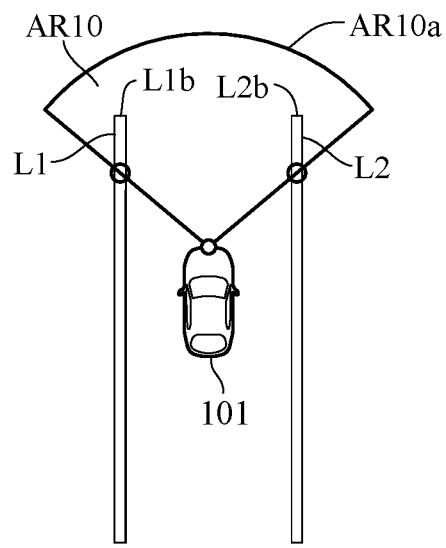
FIG. 5C is a view illustrating an example of a traveling scene following the traveling scene in FIG. 5B.

The area setting unit 144 sets an area detectable by the camera 1a, that is, the fan-shaped detectable area AR10 as illustrated in FIG. 5A on the environment map generated by the map generation unit 17 based on the information on the viewing angle θ and the maximum detection distance r stored in the memory unit 12. The detectable area varies depending on not only the performance of the camera itself but also the mounting position of the camera 1a and the like. Therefore, the area setting unit 144 sets the detectable area in consideration of the mounting position of the camera 1a. FIGS. 5B and 5C each illustrate an example of a change in the detectable area AR10 according to the movement of the subject vehicle 101. When it is assumed that FIG. 5A illustrates the position of the subject vehicle 101 at a predetermined time point T, FIG. 5B illustrates a position after Δt1 seconds (for example, 1 second) from the predetermined time point T, and FIG. 5C illustrates a position after Δt2 seconds greater than Δt1 (for example, 2 seconds). As illustrated in FIGS. 5B and 5C, the detectable area AR10 moves as the subject vehicle 101 travels. The area setting unit 144 updates the detectable area AR10 at any time.

The boundary determination unit 145 determines whether or not the end of the division line on the map generated by the map generation unit 17 is located at the boundary of the detectable area AR10 set by the area setting unit 144. For example, it is determined whether or not intersection points (limit points) P10, P11, P20, and P21 of the boundary lines and the division lines L1 and L2 as illustrated in FIG. 5A are present. The division line L1 from the limit point P10 to the limit point P11 and the division line L2 from the limit point P20 to the limit point P21 are division lines recognized by the camera 1a, and these division lines L1 and L2 are included in the division line information of the environment map generated by the map generation unit 17.

Every time the detectable area AR10 is updated, the boundary determination unit 145 determines whether or not the end of the division line on the map generated by the map generation unit 17 is located at the boundary of the detectable area AR10. When the limit points P11 and P21 move and the division lines L1 and L2 are newly detected as illustrated in FIG. 5B, the map generation unit 17 adds the detected division line information to generate the environment map. That is, the information on the division lines of the division line unknown areas L1a and L2a in FIG. 5A excluding the areas L10a and L20a in FIG. 5B is newly added to the map information (the internal map information) as the division line information.

When the boundary determination unit 145 determines that the end of the division line is located at the boundary of the detectable area AR10, the information addition unit 146 adds the boundary information to the division line information (the information on the end of the division line) and stores the division line information in the memory unit 12. For example, at the time point T illustrated in FIG. 5A and after Δt1 seconds from the time point T illustrated in FIG. 5B, the boundary information is added to each of the limit points P11 and P21 that are intersections of the boundary line AR10a indicated as an arc with the radius r centered on the camera 1a and the division lines L1 and L2. The addition of the boundary information means that it is unclear whether or not the end of the division line is an actual end. That is, it means that there is a possibility that the portion is regarded as the end due to the detection limit of the camera 1a although the end is not an actual end. In other words, the information addition unit 146 adds the attribute of the camera detection limit to the division line information.

Further, after adding the boundary information to the division line information, the information addition unit 146 removes the boundary information from the division line information when the boundary determination unit 145 determines that the end of the division line is not located at the boundary of the detectable area AR10 updated by the area setting unit 144. For example, as illustrated in FIG. 5C, when the ends L1b and L2b of the division lines L1 and L2 are included in the detectable area AR10 and the boundary (the boundary line AR10a) of the detectable area AR10 is located in front of the ends L1b and L2b of the division lines L1 and L2 after Δt2 seconds from the time point T, the boundary information is removed from the division line information stored in the memory unit 12. This finalizes the positions of the ends L1b and L2b of the division lines L1 and L2. At this time, the map generation unit 17 updates the environment map using the division line information from which the boundary information has been removed, and finalizes the map information (the internal map information). That is, the position of the end of the division line is not finalized in a state in which the boundary information is added, and the position of the end of the division line is finalized after the boundary information is removed.

Figure 7:
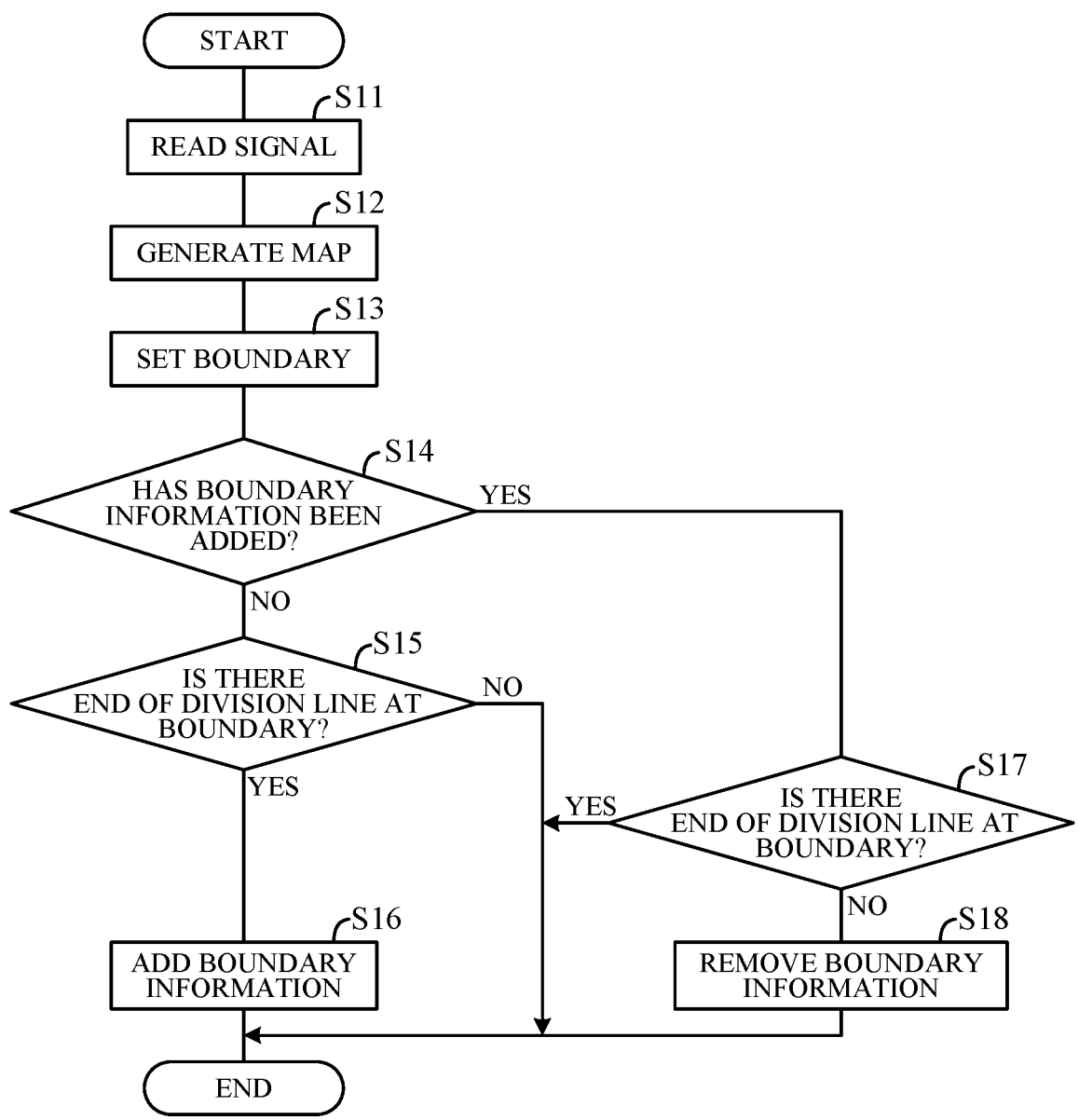
FIG. 7 is a flowchart illustrating an example of processing executed by a controller in FIG. 6.

FIG. 7 is a flowchart illustrating an example of processing executed by the controller 10 in FIG. 6 according to a predetermined program, particularly an example of processing regarding division line recognition. The processing illustrated in this flowchart is started, for example, during traveling in the manual drive mode, and is repeated at a predetermined cycle while traveling in the manual drive mode continues.

As illustrated in FIG. 7, first in S11, an image signal obtained by the camera 1a is read. Next, in S12, a map around the subject vehicle 101, that is, the environment map is generated based on the camera image acquired in S11, and the environment map is stored in the memory unit 12. At this time, the position of the division line on the road surface is recognized based on the camera image, and the information on the division line is included in the map information of the environment map and the map information is stored. Next, in S13, the substantially fan-shaped detectable area AR10 is set on the environment map generated in S12 based on the information on the viewing angle θ and the maximum detection distance r stored in the memory unit 12. That is, the boundary of the detectable area AR10 is set.

Next, in S14, it is determined whether or not the boundary information has already been added to the division line recognized in S12, for example, whether or not the boundary information has been added to the division line information in the previous processing. When a negative determination is made in S14, the processing proceeds to S15, and it is determined whether or not the end of the division line is located at the boundary (for example, the boundary line AR10a) of the detectable area AR10 set in S13. When a positive determination is made in S15, the processing proceeds to S16; when a negative determination is made, the processing ends. In S16, the boundary information is added to the information on the division line recognized in S12, the division line information is stored in the memory unit 12, and the processing ends.

Meanwhile, when a positive determination is made in S14, the processing proceeds to S17, and it is determined whether or not the end of the division line is positioned at the boundary of the detectable area AR10 set in S13, as in S15. When a negative determination is made in S17, the processing proceeds to S18; when a positive determination is made, the processing ends. In S18, the boundary information added in S16 is removed from the division line information, and the processing ends. This finalizes the position of the end of the division line, that is, the division line information.

The operation of the division line recognition apparatus 150 according to the present embodiment will be described more specifically. When the subject vehicle travels in the manual drive mode, the environment map is generated based on the camera image. Then, when the division lines L1 and L2 are detected as illustrated in FIG. 5A, the position information of the division lines L1 and L2 (the division line information) is stored in association with the environment map (S12). At this time, a part of the division lines L1 and L2 (the division line unknown areas L1a and L2a) may be outside the detectable area AR10 of the camera 1a and not be detected by the camera 1a. In this case, since the ends (the limit points P11 and P21) of the division lines are located at the boundary of the detectable area AR10, as illustrated in FIG. 5A, the boundary information indicating the detection limit of the camera 1a is added to the division line information of the division lines L1 and L2 (S16). Therefore, the controller 10 can grasp the position where the state of the division line is unknown as to whether or not there is a division line, and can perform appropriate driving control such as prohibiting traveling in the self-drive mode in the division line unknown areas L1a and L2a.

Thereafter, when the detectable area AR10 changes as the subject vehicle 101 moves and the ends L1b and L2b of the division lines are no longer located at the boundary (on the boundary line AR10a) of the detectable area AR10 as illustrated in FIG. 5C, it is determined that the ends L1b and L2b are not the limit points of the camera 1a but the ends of the actual division lines L1 and L2. Therefore, the boundary information is removed from the division line information (S18). That is, the boundary information is removed from the division line information on the condition that the state in which the division lines L1 and L2 are cut off is more clearly detected by the camera image. This finalizes the division line information, and thereafter, the traveling operation of the subject vehicle 101 is controlled in the self-drive mode using the finalized division line information.

The present embodiment can further achieve advantages and effects such as the following:

(1) The division line recognition apparatus 150 includes the camera 1a that detects the external situation around the subject vehicle 101, the map generation unit 17 that generates the environment map including the division line information on the division line on the road based on the external situation detected by the camera 1a, the area setting unit 144 that sets the area of the external space detectable by the camera 1a, that is, the detectable area AR10, the boundary determination unit 145 that determines whether or not the end of the division line (the limit points P11 and P21) on the environment map generated by the map generation unit 17 is located at the boundary (the boundary line AR10a) of the detectable area AR10 set by the area setting unit 144, and the information addition unit 146 that adds the boundary information to the division line information when the boundary determination unit 145 determines that the end of the division line is located at the boundary (FIG. 6).

With this configuration, when a judgement cannot be clearly made on whether or not the division line is cut off, the boundary information is added to the division line information in consideration of the detection limit of the camera 1a. Therefore, it is possible to prevent erroneous recognition that the actual division line is cut off when the cut division line is detected due to the detection limit of the camera 1a, and thus to appropriately perform driving control or the like using the division line.

(2) The area setting unit 144 updates the detectable area AR10 when the detectable area AR10 detectable by the camera 1a changes as the subject vehicle 101 moves (FIG. 5A to FIG. 5C). The boundary determination unit 145 determines whether or not the end of the division line on the map generated by the map generation unit 17 is located at the boundary of the detectable area AR10 updated by the area setting unit 144 (FIG. 7). This makes it possible to continuously move the detectable area AR10 as the subject vehicle 101 moves, and recognize the ends L1b and L2b (FIG. 5C) of the actual division lines L1 and L2 at an early stage.

(3) After adding the boundary information to the division line information, the information addition unit 146 removes the boundary information from the division line information when the boundary determination unit 145 determines that the ends of the division lines L1 and L2 are not located at the boundary of the detectable area AR10 updated by the area setting unit 144 (FIG. 7). This can finalize the division line information and thus makes it possible to appropriately perform traveling of the subject vehicle 101 in the self-drive mode using the environment map including the finalized division line information.

The above embodiment may be modified into various forms. Hereinafter, some modifications will be described. In the above embodiment, the external situation around the subject vehicle is detected by the external sensor group 1 such as the camera 1a; however, a detection part (detection device) other than the camera 1a such as LIDAR may be used as long as the external situation is detected for map generation. In the above embodiment, the map generation unit 17 is configured to generate the environment map while the subject vehicle travels in the manual drive mode; however, the map generation unit 17 may be configured to generate the environment map while the subject vehicle travels in the self-drive mode. In the above embodiment, the area setting unit 144 sets the area of the external space detectable by the camera 1a based on the viewing angle θ and the maximum detection distance r of the camera itself; however, if a part of the viewing angle of the camera 1a is blocked by the presence of a component arranged around the camera 1a, the detectable area is set in consideration of this. Therefore, the configuration of an area setting unit is not limited to that described above.

In the above embodiment, the boundary determination unit 145 is configured to determine whether or not the end of the division line on the map generated by the map generation unit 17 is located at the boundary of the detectable area AR10 set by the area setting unit 144 based on the camera image; however, the determination may be made on the map obtained from the detection value of LIDAR, and thus the configuration of a boundary determination unit is not limited to that described above. In the above embodiment, the information addition unit 146 is configured to add the boundary information to the division line information when the boundary determination unit 145 determines that the ends (the limit points P11 and P21) of the division lines L1 and L2 are located at the boundary; however, in addition to adding the boundary information, the information addition unit 146 may be configured to extend the division lines to generate a tentative map in the division line unknown areas L1a and L2a, and thus the configuration of an information addition unit is not limited to that described above.

In the above embodiment, the information addition unit 143 (FIG. 3) adds the obstacle detection information to the division line information when it is determined that the obstacle is adjacent to the end of the division line, and the information addition unit 146 (FIG. 6) adds the boundary information to the division line information when it is determined that the end of the division line is positioned at the boundary of the detectable area of the detection part (camera 1a). That is, an information addition unit is configured to add either the obstacle detection information or the boundary information; however, the information addition unit may be configured to add both the obstacle detection information and the boundary information.

The present invention can also be used as a division line recognition method including generating a map including a division line information on a division line on a road based on an external situation around a subject vehicle detected by a detection part such as a camera 1a, setting an area of an external space detectable by the detection part, determining whether an end of the division line on the map generated in the generating is located at a boundary of the area set in the setting, and adding a boundary information to the division line information when it is determined that the end of the division line is located at the boundary.

The above embodiment can be combined as desired with one or more of the above modifications. The modifications can also be combined with one another.

According to the present invention, it is possible to prevent a false recognition that an actual division line is broken when a broken division line is detected, even though the division line is not actually broken.

Above, while the present invention has been described with reference to the preferred embodiments thereof, it will be understood, by those skilled in the art, that various changes and modifications may be made thereto without departing from the scope of the appended claims.

What is claimed is:
1. A division line recognition apparatus, comprising:
a detection part configured to detect an external situation around a subject vehicle; and
an electronic control unit including a microprocessor and a memory connected to the microprocessor, wherein the microprocessor is configured to perform:

generating a map including division line information on a division line on a road, based on the external situation detected by the detection part;

setting an area of an external space detectable by the detection part;

determining whether an end of the division line on the map is located at a boundary of the area of the external space; and adding boundary information to the division line information when it is determined that the end of the division line is located at the boundary.

2. The division line recognition apparatus according to claim 1, wherein
the microprocessor is configured to perform
the setting including updating the area when the area detectable by the detection part changes along with a travel of the subject vehicle, and
the determining including determining whether the end of the division line on the map is located at the boundary of the area updated.

3. The division line recognition apparatus according to claim 2, wherein
the microprocessor is configured to perform
the adding including removing the boundary information from the division line information when it is determined that the end of the division line is not located at the boundary of the area updated after adding the boundary information to the division line information.

4. The division line recognition apparatus according to claim 3, wherein
the microprocessor is configured to perform
the generating including generating the map for self-driving based on the division line information after the boundary information has been removed.

5. The division line recognition apparatus according to claim 1, wherein
the detection part is a camera, and
the microprocessor is configured to perform
the determining including determining whether an image of the end of the division line is located at the boundary of the area.

6. The division line recognition apparatus according to claim 5, wherein
the microprocessor is configured to perform
the setting including setting the area based on a viewing angle of the camera and a maximum distance detectable by the camera.

7. A division line recognition apparatus, comprising:
a detection part configured to detect an external situation around a subject vehicle; and
an electronic control unit including a microprocessor and a memory connected to the microprocessor, wherein
the microprocessor is configured to function as:
a map generation unit that generates a map including division line information on a division line on a road, based on the external situation detected by the detection part;
an area setting unit that sets an area of an external space detectable by the detection part;
a boundary determination unit that determines whether an end of the division line on the map generated by the map generation unit is located at a boundary of the area set by the area setting unit; and
an information addition unit that adds boundary information to the division line information when it is determined by the boundary determination unit that the end of the division line is located at the boundary.

8. The division line recognition apparatus according to claim 7, wherein
the area setting unit updates the area set by the area setting unit when the area detectable by the detection part changes along with a travel of the subject vehicle, and
the boundary determination unit determines whether the end of the division line on the map generated by the map generation unit is located at the boundary of the area updated by the area setting unit.

9. The division line recognition apparatus according to claim 8, wherein
the information addition unit removes the boundary information from the division line information when it is determined by the boundary determination unit that the end of the division line is not located at the boundary of the area updated by the area setting unit after adding the boundary information to the division line information.

10. The division line recognition apparatus according to claim 9, wherein
the map generation unit generates the map for self-driving based on the division line information after the boundary information has been removed.

11. The division line recognition apparatus according to claim 7, wherein
the detection part is a camera, and
the boundary determination unit determines whether an image of the end of the division line is located at the boundary of the area set by the area setting unit.

12. The division line recognition apparatus according to claim 11, wherein
the area setting unit sets the area based on a viewing angle of the camera and a maximum distance detectable by the camera.

13. A division line recognition method, comprising:
generating a map including division line information on a division line on a road, based on an external situation around a subject vehicle detected by a detection part;
setting an area of an external space detectable by the detection part;
determining whether an end of the division line on the map is located at a boundary of the area; and
adding boundary information to the division line information when it is determined that the end of the division line is located at the boundary.

14. The division line recognition method according to claim 13, wherein
the setting includes updating the area when the area detectable by the detection part changes along with a travel of the subject vehicle, and
the determining includes determining whether the end of the division line on the map is located at the boundary of the area updated.

15. The division line recognition method according to claim 14, wherein
the adding includes removing the boundary information from the division line information when it is determined that the end of the division line is not located at the boundary of the area updated after adding the boundary information to the division line information.

16. The division line recognition method according to claim 15, wherein
the generating includes generating the map for self-driving based on the division line information after the boundary information has been removed.

17. The division line recognition method according to claim 13, wherein the detection part is a camera, and the determining includes determining whether an image of the end of the division line is located at the boundary of the area.

18. The division line recognition method according to claim 17, wherein the setting includes setting the area based on a viewing angle of the camera and a maximum distance detectable by the camera.

* * * * *